US010960790B2

(12) United States Patent
Yamaoka et al.

(10) Patent No.: US 10,960,790 B2
(45) Date of Patent: Mar. 30, 2021

(54) VEHICLE SEAT (71) Applicant: TACHI-S CO., LTD., Akishima (JP)

(72) Inventors: Shunsuke Yamaoka, Akishima (JP);
Hideya Shiotani, Akishima (JP)

(73) Assignee: TACHI-S CO., LTD., Akishima (JP)

(*) Notice: Subject to any disclaimer, the term of this patent is extended or adjusted under 35 U.S.C. 154(b) by 0 days.

(21) Appl. No.: 16/655,868

(22) Filed: Oct. 17, 2019

(65) Prior Publication Data
US 2020/0130542 A1 Apr. 30, 2020

(30) Foreign Application Priority Data

Oct. 25, 2018 (JP) .............................. JP2018-200842

(51) Int. Cl.
B60N 2/20 (2006.01)
B60N 2/36 (2006.01)
B60N 2/22 (2006.01)
B60N 2/90 (2018.01)

(52) U.S. Cl.
CPC ............. B60N 2/2245 (2013.01); B60N 2/20 (2013.01); B60N 2/919 (2018.02); B60N 2205/40 (2013.01)

(58) Field of Classification Search
CPC ........ B60N 2/20; B60N 2/2245; B60N 2/919; B60N 2205/40
USPC ..................................................... 297/378.13
See application file for complete search history.

(56) References Cited

U.S. PATENT DOCUMENTS

| 7,909,405 | B2 * | 3/2011 | Arima ...................... B60N 2/20 |
| | | | 297/378.13 X |
| 8,393,682 | B2 * | 3/2013 | Hosoda .................. B60N 2/366 |
| | | | 297/378.13 |
| 9,050,911 | B2 * | 6/2015 | Wieclawski ......... B60N 2/2245 |
| 9,649,964 | B2 * | 5/2017 | Imajo ....................... B60N 2/68 |
| 10,220,733 | B2 * | 3/2019 | Matsushima ............ B60N 2/90 |
| 10,266,084 | B2 * | 4/2019 | Matsushima ............ B60N 2/20 |

FOREIGN PATENT DOCUMENTS

| JP | 2007-55505 A | 3/2007 |
| JP | 2016-78627 A | 5/2016 |

* cited by examiner

Primary Examiner — Rodney B White
(74) Attorney, Agent, or Firm — Westerman, Hattori, Daniels & Adrian, LLP (57) ABSTRACT Provided is a vehicle seat capable of easily maintaining the appearance. A bezel of the vehicle seat is abutted on a body fixing member so that the shift of the bezel in the direction in which the bezel is separated from an exposing section of a body is restricted by the body fixing member.

12 Claims, 5 Drawing Sheets

VEHICLE SEAT

TECHNICAL FIELD

The present invention relates to a vehicle seat. More specifically, the present invention relates to a vehicle seat that can easily maintain the appearance.

BACKGROUND ART

There has been known a vehicle seat in which an operation device (for example, a lever-type lock releasing device that can adjust the angle of a seat back by releasing the locked state by a reclining device) is mounted to a frame through the opening of a trim cover.

Patent Literature 1 discloses a technique in which a front side frame 12B (edge) of a bezel 12 (body) is applied from the front side of a back cover 2C (trim cover) to the periphery of a through hole 2C3 (opening) of the back cover 2C, and a back side frame 13A (abutting section) of a backing member 13 (bezel) is applied from the back side of the back cover 2C to the periphery of the through hole 2C3 of the back cover 2C, so that the periphery of the through hole 2C3 of the back cover 2C is brought into a good appearance state.

Likewise, Patent Literature 2 discloses a technique in which a flap 43b (edge) of a lock knob garnish 43 (body) is applied from the front side of a skin material 13 (trim cover) to the periphery of the opening of the skin material 13, and a trim plate 44 (bezel) is applied from the back side of the skin material 13 to the periphery of the opening of the skin material 13.

CITATION LIST

Patent Literature

Patent Literature 1: Japanese Unexamined Patent Application Publication No. 2016-78627 (for example, paragraphs 0026 and 0027, and FIG. 3)

Patent Literature 2: Japanese Unexamined Patent Application Publication No. 2007-55505 (for example, paragraphs 0033 and 0035, and FIG. 8)

SUMMARY OF INVENTION

Technical Problem

However, in the above conventional art, when the front face of the trim cover (in particular, the periphery of the opening of the trim cover) is pushed in by the passenger to compress the seat pad, the bezel is pushed and sunk together with the trim cover, so that there is a problem that a gap is formed between the edge of the body and the abutting section of the bezel to deteriorate the appearance.

The present invention has been made to solve the above problem, and an object of the present invention is to provide a vehicle seat that can easily maintain the appearance.

Solution to Problem

To achieve this object, a vehicle seat of the present invention includes a trim cover, a seat pad whose surface is covered by the trim cover, a frame supporting the seat pad, a supporting device shiftably supporting the frame, and an operation device transmitting a releasing force to the supporting device to enable the frame to be shifted, the operation device being mounted to the frame through the opening of the trim cover. The operation device includes a bezel having an abutting section abutted on the back face side of the trim cover and to which a terminal along the opening of the trim cover is coupled, and a body having an edge covering, from the front face side, the portion of the trim cover in which the abutting section of the bezel is abutted on the back face side and fastened and fixed to the frame. The bezel includes a first frame abutting section formed to be abuttable on the frame. The first frame abutting section is abutted on the frame, the frame restricting the shift of the bezel in a first direction that is the direction in which the abutting section of the bezel is separated from the edge of the body.

Advantageous Effects of Invention

According to the vehicle seat of a first aspect, the bezel includes a first frame abutting section formed to be abuttable on the frame, and the first frame abutting section is abutted on the frame, the frame restricting the shift of the bezel in a first direction that is the direction in which the abutting section of the bezel is separated from the edge of the body, so that even when the front face of the trim cover (in particular, the periphery of the opening of the trim cover) is pushed in by the passenger to compress the seat pad, the bezel can be prevented from being pushed and sunk together with the trim cover. Thus, a gap can be prevented from being formed between the edge of the body and the abutting section of the bezel, so that the appearance can be easily maintained.

According to the vehicle seat of a second aspect, in addition to the effect provided by the vehicle seat of the first aspect, the following effect is provided. The bezel includes at least one second frame abutting section formed to be abuttable on the frame, and the second frame abutting section is abutted on the frame, the frame restricting the shift of the bezel in the direction orthogonal to the first direction, so that the movable range of the bezel can be defined.

Thus, for example, when in the assembling process, the bezel is temporarily placed to the frame and (or) the seat pad and the body is then mounted, the position shift of the bezel in the lateral direction (the direction orthogonal to the first direction) can be accommodated within the predetermined range. As a result, the assembling can be made easy.

Also, for example, when the front face of the trim cover is pushed in or pulled, it is possible to prevent the exposing of the terminal of the trim cover due to the position shift of the bezel in the lateral direction (the direction orthogonal to the first direction). As a result, the appearance can be easily maintained.

According to the vehicle seat of a third aspect, in addition to the effect provided by the vehicle seat of the second aspect, the following effect is provided. The bezel is deformed more easily than the frame, so that in the disposing (engaging, mounting) process of the bezel to the frame, the bezel can be deformed (distortion corrected). With this, the bezel can be easily engaged to the frame.

According to the vehicle seat of a fourth aspect, in addition to the effect provided by the vehicle seat of the second aspect, the following effect is provided. A plurality of second frame abutting sections are formed to be spaced at a predetermined distance in the direction orthogonal to the direction in which the shift of the bezel is restricted by the abutting on the frame and the first direction, so that the shift of the bezel in which the first direction is a rotation axis can be prevented. Also, by forming the plurality of second frame abutting sections, the extension length of each of the second frame abutting sections can be shortened, so that the product cost can be reduced, and the free degree of the design of the bezel can be improved.

According to the vehicle seat of a fifth aspect, in addition to the effect provided by the vehicle seat of the first aspect, the following effect is provided. The bezel includes at least one body abutting section formed to be abuttable on the body in the direction orthogonal to the first direction, so that by abutting the body on the body abutting section of the bezel, the bezel can be shifted in the direction orthogonal to the first direction.

Accordingly, for example, when in the assembling process, the bezel is temporarily placed to the frame and (or) the seat pad and the body is then mounted, even when the position where the bezel is temporarily placed is position shifted in the lateral direction (the direction orthogonal to the first direction), the body can be mounted to the frame while the abutting of the bezel (body abutting section) and the body shifts the bezel to the proper position. That is, the inhibition by the bezel in the mounting of the body to the frame can be difficult. As a result, the assembling can be made easy.

According to the vehicle seat of a sixth aspect, in addition to the effect provided by the vehicle seat of the fifth aspect, the following effect is provided. The bezel is deformed more easily than the body, so that in the disposing (engaging, mounting) process of the body to the frame, the body can be deformed (distortion corrected). With this, the bezel can be prevented from being disposed to the disposing region of the body, so that the body can be easily mounted (or easily fixed) to the frame.

According to the vehicle seat of a seventh aspect, in addition to the effect provided by the vehicle seat of the fifth aspect, the following effect is provided. The vehicle seat includes a lever rotatably axially supported on the body, the body includes a lever abutting section on which the lever is abutted, and the body abutting section of the bezel is formed at the position overlapped with the lever abutting section of the body, as seen in the direction orthogonal to the direction in which the lever is abutted on the lever abutting section and the first direction, so that for example, when the lever is operated by an excessive force to cause a large force to act from the lever to the lever abutting section of the body, the vicinity of the lever abutting section of the body is abutted on the body abutting section of the bezel, so that the body (the vicinity of the lever abutting section) can be prevented from being deformed. As a result, the body can be prevented from being damaged.

According to the vehicle seat of an eighth aspect, in addition to the effect provided by the vehicle seat of the first aspect, the following effect is provided. The seat pad includes a recess section in which the bezel is disposed, and the bezel is disposed in the recess section in a state where at least a portion of the outer face of the bezel is in contact with the inner face of the recess section, so that the bezel can be held in the seat pad (recess section).

Thus, for example, when in the assembling process, the bezel is temporarily placed to the frame and (or) the seat pad and the body is then mounted, the holding force of the seat pad (recess section) is used to be capable of preventing the bezel from falling off. As a result, the assembling can be made easy.

According to the vehicle seat of a ninth aspect, the bezel includes a third frame abutting section formed to be abuttable on the frame, and the third frame abutting section is abutted on the frame, the frame restricting the shift of the bezel in the direction opposite the first direction. Thus, in addition to the effect provided by the vehicle seat of the first aspect, the following effect is provided. That is, for example, when in the assembling process, the bezel is temporarily placed to the frame and (or) the seat pad and the body is then mounted, the bezel can be prevented from falling off. As a result, the assembling can be made easy.

According to the vehicle seat of a tenth aspect, in addition to the effect provided by the vehicle seat of the ninth aspect, the following effect is provided. The frame includes a fastening section to which the body is fastened and fixed, and the third frame abutting section of the bezel is abutted on the fastening section of the frame, so that the position of the body constrained by the frame in the direction opposite the first direction and the position of the bezel constrained by the frame in the direction opposite the first direction can be the same. Thus, when an external force acts on the bezel in the direction opposite the first direction, the body can easily follow the shift of the bezel, so that the body can be prevented from being damaged.

According to the vehicle seat of an eleventh aspect, in addition to the effect provided by the vehicle seat of the first aspect, the following effect is provided. As seen in the first direction, the inner shape of the abutting section of the bezel is formed to be smaller than the outer shape of the edge of the body, and the outer shape of the abutting section of the bezel is formed to be larger than the outer shape of the edge of the body, so that when the edge is pushed in by the passenger to be deformed, the outer periphery of the edge can be supported from below by the abutting section, so that the edge can be prevented from being damaged.

DESCRIPTION OF EMBODIMENTS

Figure 1:
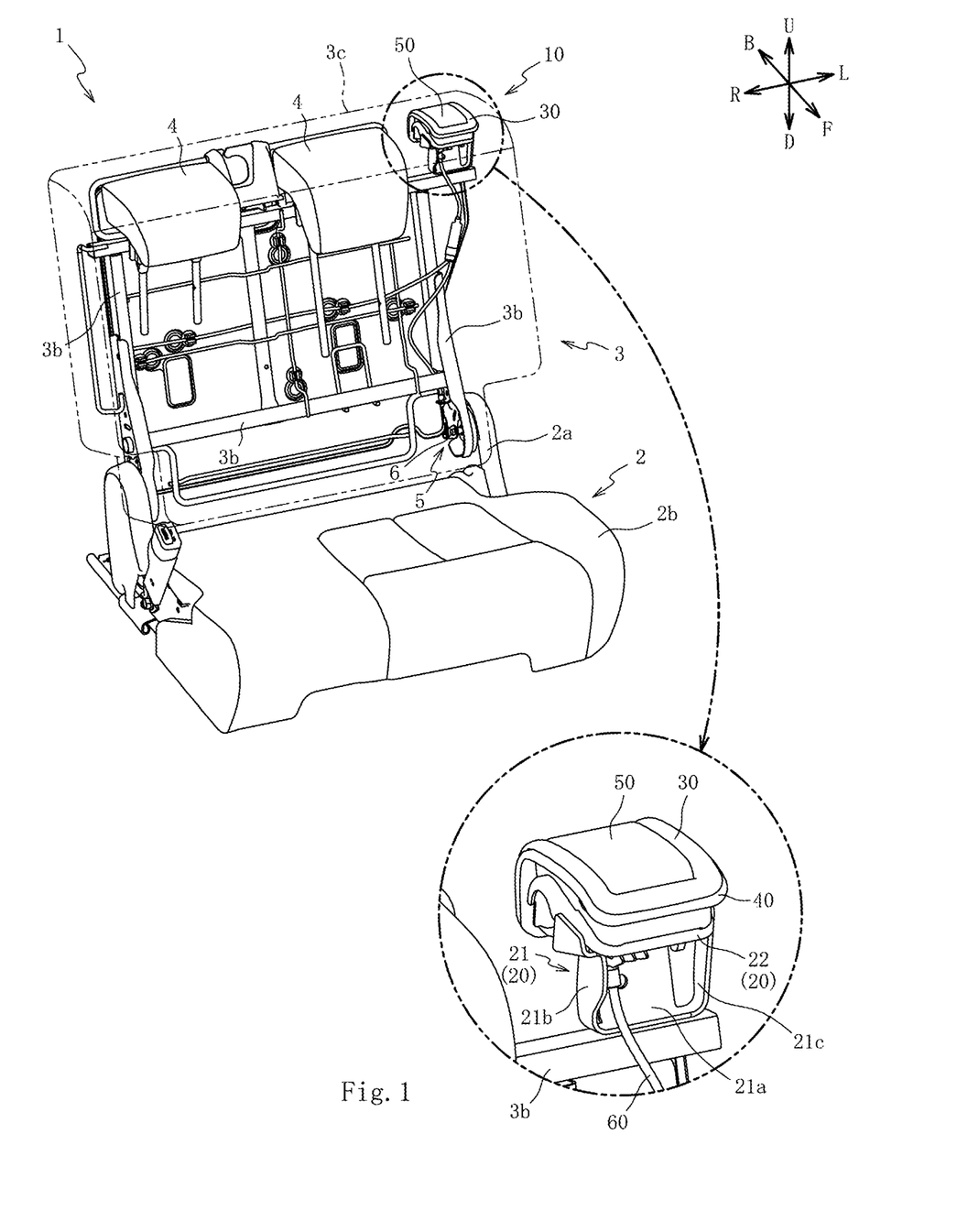
FIG. 1 is an upper perspective view of a seat including a lock releasing unit according to an embodiment of the present invention.

Hereinafter, a preferred embodiment of the present invention will be described with reference to the accompanying drawings. FIG. 1 is an upper perspective view of a seat 1 including a lock releasing unit 10 according to an embodiment of the present invention.

It should be noted that in FIG. 1, the illustration of a back pad 3a is omitted, and the outer shape of a trim cover 3c is schematically illustrated by using alternate long and two short dashes lines. Also, the arrows F-B, L-R, and U-D in FIG. 1 indicate the front-back direction, the left-right direction, and the up-down direction of the seat 1, respectively. Also, this is ditto for the following drawings, and the description thereof is thus omitted. However, the left-right direction and the front-back direction of the seat 1 do not always coincide with the left-right direction and the front-back direction, respectively, of a vehicle on which the seat 1 is mounted.

As illustrated in FIG. 1, the seat 1 is a seat for two persons mounted on the vehicle, such as an automobile and a train. It should be noted that the seat 1 may be a seat for one person, and the seat 1 may be the seat of an aircraft, a ship, and the like, other than the vehicle. The seat 1 includes a seat cushion 2 configuring a seat surface, a seat back 3 configuring a backrest, and a headrest 4 fixed to the upper end of the seat back 3.

In the seat cushion 2, a cushion pad (not illustrated) configured of a foam body, such as a flexible polyurethane foam, is supported on a cushion frame 2a, the cushion pad being covered by a trim cover 2b. Likewise, in the seat back 3, the back pad 3a (see FIG. 4A) configured of a foam body, such as a flexible polyurethane foam, is supported on a back frame 3b, the back pad 3a being covered by the trim cover 3c.

The back frame 3b forms the skeleton of the seat back 3, and is configured by combining metal members by welding, screwing, and the like. It should be noted that at least part or all of the back frame 3b may be configured of a synthetic resin member.

The trim cover 3c forms the surface of the seat back 3, and is formed by suturing a plurality of cover materials. The entire face or part of each of the cover materials is formed by bonding, with an adhesive, a skin material configured of a genuine leather, a synthetic leather, a fabric, and the like and a wadding material configured of a non-woven cloth, a foam body, such as a flexible polyurethane foam, and the like.

The member on the lower end side of the back frame 3b is coupled to the back end of the cushion frame 2a via a reclining device 5. The reclining device 5 supports the seat back 3 such that the seat back 3 can be angle adjusted with respect to the seat cushion 2, and includes a lock releasing section 6 that can be rotated about a rotation axis.

The lock releasing section 6 releases the maintaining of the posture (angle) of the seat back 3 with respect to the seat cushion 2, and is biased to the predetermined position illustrated in FIG. 1 by the resilient force of a spring member (not illustrated).

When the lock releasing section 6 is not operated, the posture (angle) of the seat back 3 with respect to the seat cushion 2 is maintained. The lock releasing unit 10, that is, the lock releasing section 6 is operated to be rotationally operated against the resilient force of the spring member, so that the seat back 3 is rotatable with respect to the seat cushion 2, and the angle of the seat back 3 can thus be adjusted.

Figure 2:
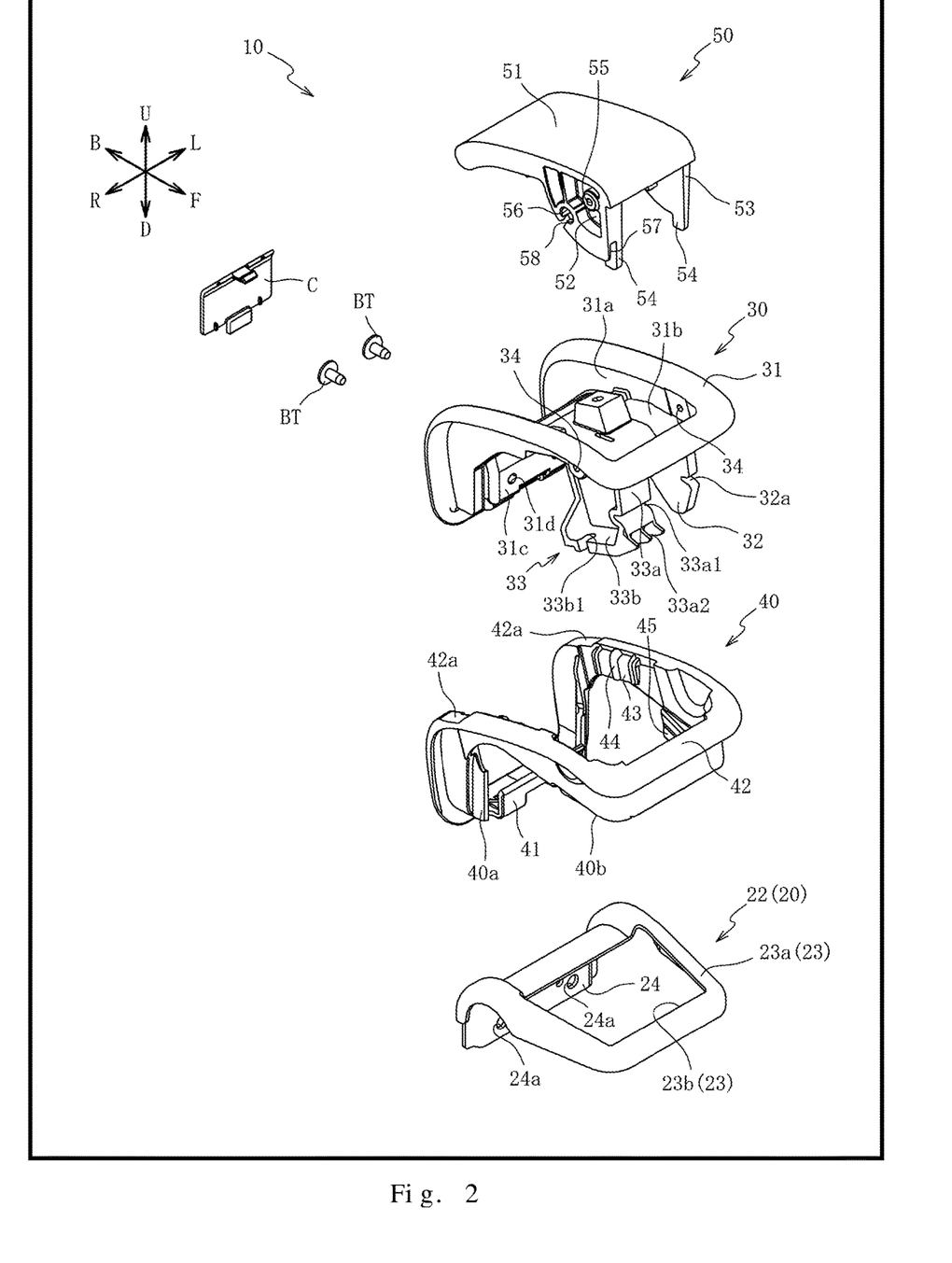
FIG. 2 is an exploded upper perspective view of the lock releasing unit.
Figure 3A:
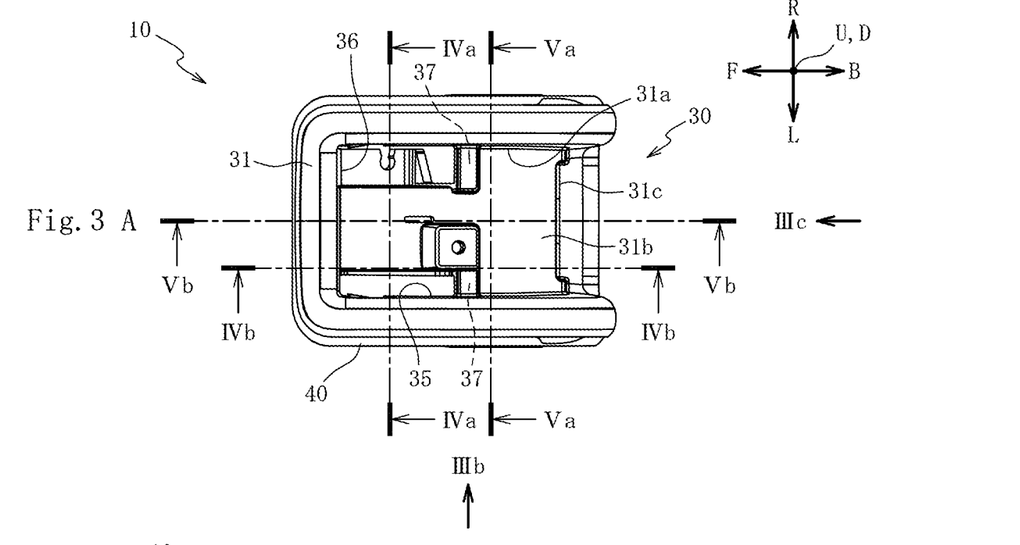
FIG. 3A is a top view of the lock releasing unit.
Figure 3B:
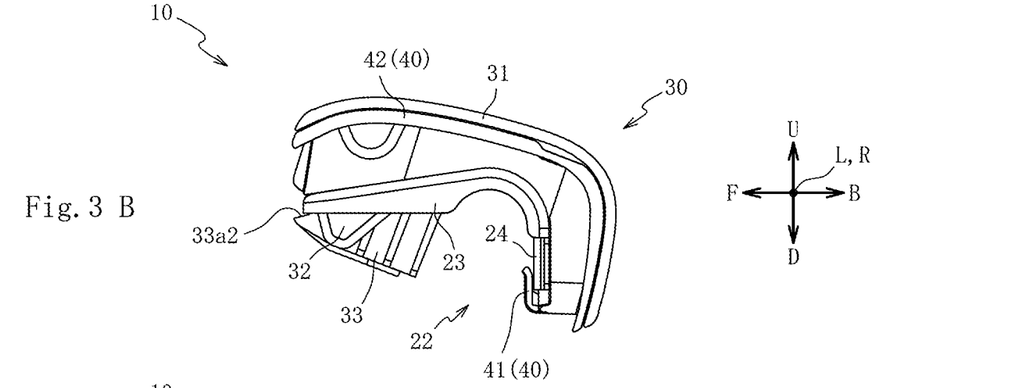
FIG. 3B is a side view of the lock releasing unit, as seen in the direction of the arrow IIIb of FIG. 3A.
Figure 3C:
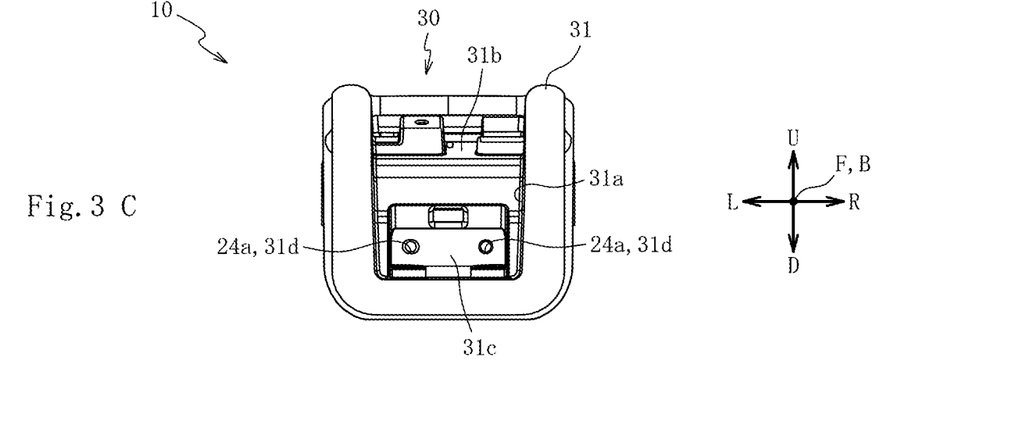
FIG. 3C is a back view of the lock releasing unit, as seen in the direction of the arrow IIIc of FIG. 3A.
Figure 4:
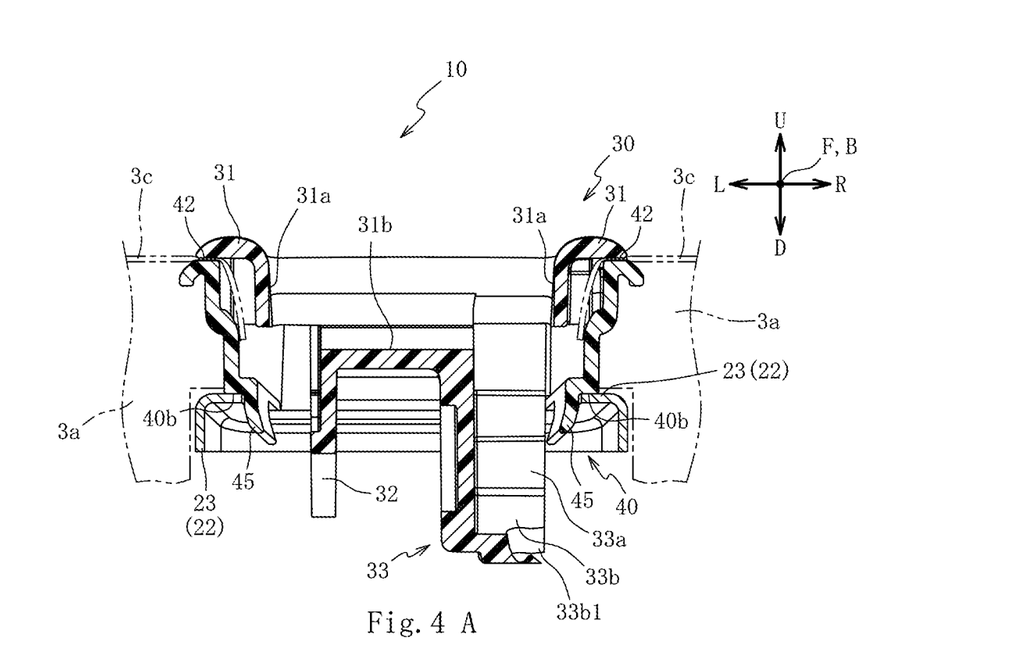
FIG. 4A is a cross-sectional view of the lock releasing unit taken along line IVa-IVa of FIG. 3A.
FIG. 4B is a cross-sectional view of the lock releasing unit taken along line IVb-IVb of FIG. 3A.
Figure 5:
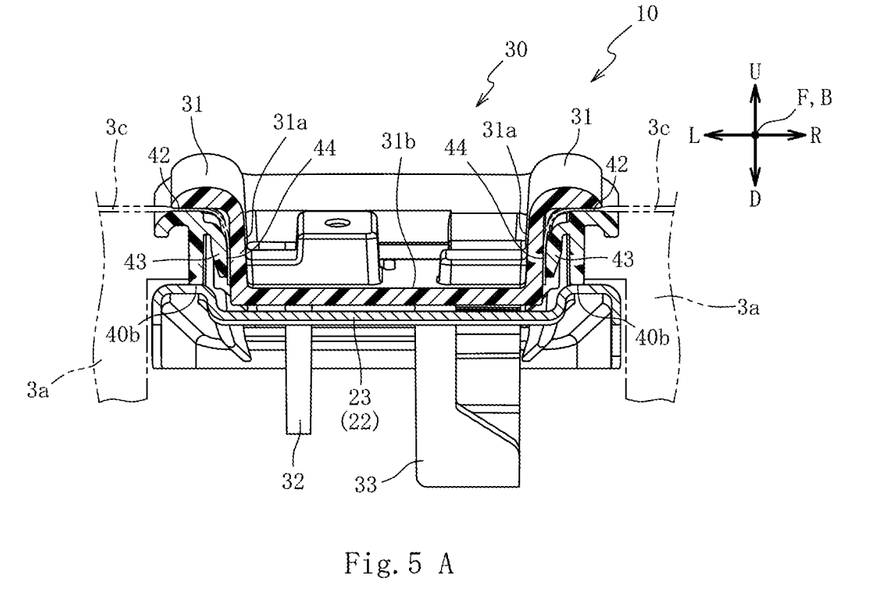
FIG. 5A is a cross-sectional view of the lock releasing unit taken along line Va-Va of FIG. 3A.
FIG. 5B is a cross-sectional view of the lock releasing unit taken along line Vb-Vb of FIG. 3A.

Then, the lock releasing unit 10 will be described with reference to FIGS. 2 to 5B, in addition to FIG. 1. FIG. 2 is an exploded upper perspective view of the lock releasing unit 10. FIG. 3A is a top view of the lock releasing unit 10, FIG. 3B is a side view of the lock releasing unit 10, as seen in the direction of the arrow IIIb of FIG. 3A, and FIG. 3C is a back view of the lock releasing unit 10, as seen in the direction of the arrow IIIc of FIG. 3A. FIG. 4A is a cross-sectional view of the lock releasing unit 10 taken along line IVa-IVa of FIG. 3A, and FIG. 4B is a cross-sectional view of the lock releasing unit 10 taken along line IVb-IVb of FIG. 3A. FIG. 5A is a cross-sectional view of the lock releasing unit 10 taken along line Va-Va of FIG. 3A, and FIG. 5B is a cross-sectional view of the lock releasing unit 10 taken along line Vb-Vb of FIG. 3A.

It should be noted that in FIG. 2, the illustration of a frame fixing member 21 and a cable 60 is omitted, and from FIG. 3A to FIG. 5B, the illustration of the frame fixing member 21, a lever 50, the cable 60, a cover C, and bolts BT is omitted. Also, from FIG. 4A to FIG. 5B, the outer shapes of the back pad 3a and the trim cover 3c are illustrated by alternate long and two short dashes lines.

As illustrated from FIG. 1 to FIG. 5B, the lock releasing unit 10 includes a bracket 20 fixed to the back frame 3b, a body 30 fixed to the bracket 20, a bezel 40 sandwiched between the bracket 20 and the body 30, the lever 50 rotatably supported (axially supported) on the body 30, and the cable 60 coupling the lever 50 and the lock releasing section 6. Each of the body 30, the bezel 40, and the lever 50 is a synthetic resin member.

The bracket 20 fixes the lock releasing unit 10 to the seat 1 (back frame 3b), and includes the frame fixing member 21 (see FIG. 1), and a body fixing member 22 fixed to the frame fixing member 21 by welding, screwing, and the like. The frame fixing member 21 and the body fixing member 22 are formed by subjecting metal plates to bending processing and shearing processing.

The frame fixing member 21 includes a base section 21a that is substantially rectangular, as seen in front view (the direction of the double-headed arrow F-B), and coupling sections 21b and 21c formed to be vertically long and substantially rectangular, as seen in side view (the direction of the double-headed arrow L-R) and protruded from both ends in the left-right direction (the direction of the double-headed arrow L-R) of the base section 21a. The base section 21a is abutted on the back frame 3b to be welded and screwed, so that the frame fixing member 21 is fixed to the back frame 3b, and the body fixing member 22 is fixed to the coupling sections 21b and 21c of the frame fixing member 21 by welding and screwing. With this, the bracket 20 is fixed to the back frame 3b.

The body fixing member 22 fixes the body 30, and includes a main body 23 formed to be in substantially rectangular frame shape, as seen in top view, and a fixing section 24 bent substantially perpendicularly and extended downward from the end on the back side of the main body 23.

The main body 23 is the portion for abutting the bezel 40 on an upper face 23a thereof, and the outer peripheral edge of the main body 23 is formed to be slightly curved downward. In the main body 23, an opening 23b penetrated and bored through in its plate thickness direction is formed. Portions of the bezel 40 (frame abutting sections 45) are abutted on the inner edge (inside face) of the opening 23b, so that the shift of the bezel 40 with respect to the body fixing member 22 can be restricted to a predetermined amount.

The fixing section 24 is the portion on which an abutting section 31c of the body 30 described later is abutted, and in the fixing section 24, a plurality (in this embodiment, two) of insertion through holes 24a are formed. To the face of the fixing section 24 on the opposite side of the face of the fixing section 24 on which the abutting section 31c is abutted, nuts (not illustrated) are disposed (fixed) at the positions corresponding to the insertion through holes 24a. Also, both ends of the fixing section 24 in the left-right direction are formed to be protruded backward.

The body 30 rotatably supports the lever 50, and includes an exposing section 31 exposed to the outside of the trim cover 3c, and protrusion sections 32 and 33 protruded downward (in the direction of the arrow D). To the exposing section 31, a recess section 31a that is substantially rectangular, as seen in top view is recessed, and the protrusion sections 32 and 33 are protruded from the lower face of a bottom wall 31b forming the bottom face of the recess section 31a.

Since the recess section 31a is recessed, the exposing section 31 is formed to be in substantially rectangular frame shape, as seen in top view, and the back side of the exposing section 31 is formed to be curved downward along the body fixing member 22.

The recess section 31a is the portion for accommodating the lever 50 inside, and is formed to be slightly larger than the outer shape of the lever 50. To the bottom wall 31b of the recess section 31a at the position where the exposing section 31 is curved, the abutting section 31c is formed. The abutting section 31c is the portion on which the fixing section 24 of the body fixing member 22 is abutted, and a plurality (in this embodiment, two) of insertion through holes 31d are formed in the abutting section 31c at the positions corresponding to the insertion through holes 24a of the fixing section 24. The bolts BT inserted through the insertion through holes 24a and 31d are threaded to the nuts, so that the body 30 is fixed to the body fixing member 22.

To the body 30, the cover C for preventing the bolts BT from being visible is disposed forward of the abutting section 31c. With this, the appearance of the body 30 (lock releasing unit 10) can be prevented from being deteriorated.

Axial holes 34 for rotatably axially supporting the lever 50 are formed to be penetrated through the recess section 31a. The axial holes 34 are disposed in a state where their axial direction is along the left-right direction (the direction of the double-headed arrow L-R). Also, in the bottom wall 31b on the front side (the side in the direction of the arrow F) of the recess section 31a, an opening 35 for inserting a portion of the lever 50 (rotation plate 53) through the bottom wall 31b is formed, and an opening 36 for inserting a portion of the lever 50 (rotation plate 52) through the bottom wall 31b is formed. The openings 35 and 36 are formed to be substantially rectangular, as seen in top view, and are disposed at the same position in the front-back direction (the direction of the double-headed arrow F-B). Also, to the lower face of the bottom wall 31b, a pair of rotation restriction sections 37 on which portions of the lever 50 (sections on the side in which rotation is stopped 54) are abutted are formed.

The protrusion section 32 is protruded along the edge extended in the front-back direction (the direction of the double-headed arrow F-B) of the opening 35, and the protrusion section 33 is protruded along the edge extended in the front-back direction (the direction of the double-headed arrow F-B) of the opening 36. The protrusion section 32 is formed to be a planar body in which its plate thickness direction is directed toward the left-right direction (the direction of the double-headed arrow L-R), and a notch section 32a that is recessed backward (in the direction of the arrow B) is notch formed to the front face of the protrusion section 32.

The protrusion section 33 is protruded to be position shifted in the left-right direction (to the side in the direction of the arrow R) with respect to the protrusion section 32. The protrusion section 33 is formed to be in box shape in which its face on the opposite side of the protrusion section 32 is opened. To a forward wall 33a of the protrusion section 33, a notch section 33a1 that is recessed backward is notch formed at the position where the notch section 33a1 has substantially the same height as the notch section 32a of the protrusion section 32 in the up-down direction (the direction of the double-headed arrow U-D).

Also, downward (in the direction of the arrow D) of the notch section 33a1, protrusions 33a2 are protruded forward (in the direction of the arrow F). The inner peripheral edge of the main body 23 of the body fixing member 22 is disposed into (fitted into) the notch sections 32a and 33a1, and the curved end of the outer peripheral edge of the main body 23 is abutted on the upper faces of the protrusions 33a2, so that the position in the up-down direction of the body 30 with respect to the body fixing member 22 is positioned.

Also, to a bottom wall 33b of the protrusion section 33, a U-groove 33b1 formed in U-shape, as seen in bottom view is formed. The U-groove 33b1 is formed to be penetrated through the bottom wall 33b in the plate thickness direction, and is disposed in a state where the face of the U-groove 33b1 on the opposite side of the protrusion section 32 is opened. The cable 60 (see FIG. 1) is inserted through the U-groove 3ab1 through the opening portion.

The rotation restriction sections 37 are respectively formed at both ends in the left-right direction of the lower face of the bottom wall 31b. Also, the rotation restriction sections 37 are respectively formed at substantially the centers in the front-back direction. With this, in a state where the portions of the lever 50 (sections on the side in which rotation is stopped 54) are abutted, the force can be prevented from biasedly acting on the lower face of the bottom wall 31b due to the abutting, so that the body 30 can be prevented from being deformed (distorted).

The bezel 40 prevents a gap from being formed between the body 30 and the trim cover 3c, and is formed in substantially rectangular frame shape, as seen in top view, and the back side (the side in the direction of the arrow B) of the bezel 40 is formed to be curved downward (in the direction of the arrow D) along the exposing section 31. On the curved down side of the bezel 40, a pawl 41 is formed.

The pawl 41 is the portion for restricting the shift of the bezel 40 in the front-back direction (the direction of the double-headed arrow F-B) and in the up direction (the direction of the arrow U) with respect to the body fixing member 22, and is formed in substantially L-shape, as seen in cross-sectional view, from a first portion protruded from the inner peripheral face of the frame of the bezel 40 toward the center (in the direction of the arrow F) and a second portion protruded upward (in the direction of the arrow U) from the protruded end of the first portion. It should be noted that the pawl 41 is disposed at substantially the center of the bezel 40 in the left-right direction (the direction of the double-headed arrow L-R).

To the portion of the bezel 40 curved downward, vertical walls 40a are formed which are disposed to be spaced at a predetermined interval with respect to the first portion of the pawl 41 in the left-right direction (the direction of the double-headed arrow L-R). The first portion of the pawl 41 is abutted on the lower edge (the outer edge on the side in the direction of the arrow D) of the fixing section 24 of the body fixing member 22, so that the shift of the bezel 40 in the up direction (the direction of the arrow U) with respect to the body fixing member 22 can be restricted. Also, the fixing section 24 of the body fixing member 22 is sandwiched between the second portion of the pawl 41 and the vertical walls 40a, so that the shift of the bezel 40 in the front-back direction (the direction of the double-headed arrow F-B) with respect to the body fixing member 22 can be restricted.

Also, the vertical walls 40a are abutted on both ends of the fixing section 24 formed to be protruded backward, so that the shift of the bezel 40 in the left-right direction with respect to the body fixing member 22 can be restricted.

Dent sections 42a are recessed to an upper face 42 on the back side (the side in the direction of the arrow B) of the bezel 40. The suturing allowances of the trim cover 3c are disposed in the dent sections 42a, so that the raising of the outer face of the trim cover 3c to deteriorate the appearance can be prevented.

The inner peripheral edge of the bezel 40 formed in substantially rectangular frame shape, as seen in top view is formed to be larger than the outer shape of the recess section 31a of the body 30 and to be smaller than the outer shape of the exposing section 31. With this, the exposing section 31 of the body 30 can be opposed to the upper face 42 of the bezel 40 (or the exposing section 31 of the body 30 can be disposed at the position overlapped with the upper face 42 of the bezel 40, as seen in top view). Also, the outer shape of the bezel 40 is formed to be larger than the outer shape of the exposing section 31. As a result, when the exposing section 31 exposed to the outside of the trim cover 3c is pushed in by the passenger to be deformed, the outer periphery of the exposing section 31 can be supported from below by the upper face 42 of the bezel 40, so that the exposing section 31 can be prevented from being damaged.

Also, to the inner peripheral edge of the bezel 40, a plurality (in this embodiment, three) of cover locking sections 43 for locking (coupling) the terminals of the trim cover 3c are formed. Each of the cover locking sections 43 is formed in substantially L-shape, as seen in cross-sectional view, from a first portion protruded from the inner peripheral face of the frame toward the center and a second portion protruded downward (in the direction of the arrow D) from the protruded end of the first portion.

Each of a pair of cover locking sections 43 is disposed forward (in the direction of the arrow F) of the portion of the bezel 40 curved downward and at the position in such a manner that the position in the front-back direction (the direction of the double-headed arrow F-B) is substantially the same as each of the rotation restriction sections 37 of the body 30 (or at the position overlapped with the rotation restriction section 37, as seen in the left-right direction (the direction of the double-headed arrow L-R)). Also, one cover locking section 43 is disposed at the position opposed to the pawl 41 in the front-back direction (see FIG. 4B). The downward-protruded portion (the second portion) of each of the cover locking sections 43 is formed to be tilted downward and toward the center of the frame.

To the downward-protruded portion (the second portion) of each of the cover locking sections 43, a body abutting section 44 formed to be abuttable on the outer face of the recess section 31a of the body 30 is protruded toward the center of the frame. The body abutting section 44 is the portion in which when the body 30 is mounted (fixed) to the body fixing member 22, the body abutting section 44 is abutted on the body 30 (the outer face of the recess section 31a to allow the bezel 40 to follow the body 30. With this, the bezel 40 can be shifted to the predetermined position with the mounting operation of the body 30, so that the inhibition by the bezel 40 in the mounting of the body 30 can be prevented. As a result, the body 30 can be easily mounted to the body fixing member 22.

Also, in a state where the body 30 is mounted to the body fixing member 22, the shift of the bezel 40 can be restricted by the body 30. Thus, the fixing of the bezel 40 to the body 30 or the body fixing member 22 can be unnecessary, so that the number of assembling steps can be reduced. Also, the cover locking sections 43 are formed to be tilted toward the center of the bezel 40 formed in frame shape, so that the bezel 40 can be shifted as the body 30 is shifted toward the body fixing member 22.

Also, to the inner peripheral edge of the bezel 40, a pair of frame abutting sections 45 protruded downward (in the direction of the arrow D) are disposed forward (in the direction of the arrow F) of the cover locking sections 43 while being opposed to each other in the left-right direction (the direction of the double-headed arrow L-R). The opposing distance between the faces (outer faces) on the opposite sides of the opposing faces of the frame abutting sections 45 is formed to be smaller than the opposing distance between the inner peripheral edges of the opening 23b of the body fixing member 22 in the left-right direction (the direction of the double-headed arrow L-R). That is, a predetermined gap is formed between the outer face of each of the frame abutting sections 45 and each of the inner peripheral edges of the opening 23b.

Also, the frame abutting sections 45 are formed to be tilted downward and toward the center of the frame, that is, the opposing distance between the pair of frame abutting sections 45 is formed to be smaller to the down side. With this, the bezel 40 can be easily disposed to the body fixing member 22.

The lever 50 pulls the cable 60 by its rotation, and includes an operation section 51 disposed in the recess section 31a of the body 30, and the rotation plates 52 and 53 protruded downward from the lower face of the operation section 51. In the rotation plates 52 and 53, axial holes 55 are formed, so that the lever 50 is rotatable with respect to the body 30 in such a manner that the axial holes 55 are rotation centers.

The operation section 51 is in substantially rectangular shape, as seen in top view, and is formed to be slightly smaller than the recess section 31a. Each of the rotation plates 52 and 53 is in substantially fan shape, as seen in side view (as seen in the direction of the double-headed arrow L-R) (the shape in which the circle about each of the axial holes 55 is cut at a center angle of approximately 90 degrees), and the rotation plates 52 and 53 are respectively disposed at both ends in the left-right direction (the direction of the double-headed arrow L-R) of the operation section 51. To the rotation plates 52 and 53, the sections on the side in which rotation is stopped 54 protruded downward from the arc faces that are their outer peripheral faces are formed. Also, in the rotation plate 52, a circular hole 56 and a notch section 57 communicating with the circular hole 56 are recessed at the positions spaced from the axial hole 55 by predetermined distances.

The sections on the side in which rotation is stopped 54 are the portions for restricting the rotation of the lever 50 by being abutted on the rotation restriction sections 37 of the body 30, and are protruded from the arc faces of the rotation plates 52 and 53 to the outside in the radial direction (the direction separated from the axial holes 55). The axial holes 55 are disposed in a state where their axial direction is along the left-right direction, and when the lever 50 is disposed to the body 30, the axial holes 55 are formed at the positions corresponding to the axial holes 34 of the body 30, as seen in side view.

The circular hole 56 is recessed from the face on the opposite side of the rotation plate 53 toward the rotation plate 53. The notch section 57 is formed as a recessed groove recessed to the arc face of the rotation plate 52. Also, in the rotation plate 52, an insertion through section 58 communicating the circular hole 56 and the outside is formed. With this, one end (cable end) of the cable 60 can be fitted in the circular hole 56.

The cable 60 couples the lever 50 and the lock releasing section 6, and mainly includes a cable made of a metal, such as a stainless steel, covered by a synthetic resin having mobility, and has predetermined flexibility. The cable 60 is mainly inserted through an outer pipe made by covering the core material made of a metal, such as a stainless steel, by a synthetic resin, one end (cable end) of the cable 60 is rotatably fitted in the circular hole 56 of the lever 50, and the other end of the cable 60 is engaged to the engaging section of the lock releasing section 6, so that the lever 50 and the lock releasing section 6 are coupled by the cable 60.

Then, the assembling process of the lock releasing unit 10 to the back frame 3b will be described. First, the back pad 3a is mounted to the back frame 3b to which the bracket 20 is disposed. An opening is formed to be penetrated through the back pad 3a at the position where the lock releasing unit 10 is mounted. Through this opening, the bezel 40 and the body 30 are fixed to the body fixing member 22. It should be noted that the opening may be formed to be in recessed shape, that is, to include a bottom face.

Then, after the back pad 3a except for the periphery of the opening is covered by the trim cover 3c, the bezel 40 is engaged to the body fixing member 22 through the opening of the back pad 3a. Here, the inner shape of the opening of the back pad 3a is formed to be slightly smaller than the outer shape of the bezel 40, so that the bezel 40 is abutted in a state where the opening is gushingly enlarged. Thus, the recovering force of the back pad 3a acts on the bezel 40, so that the bezel 40 is supported by the back pad 3a.

It should be noted that at least a portion of the outer face of the bezel 40 is abutted on the back pad 3a. For example, only the outer faces of the vertical walls 40a may be abutted on the inner face of the opening of the back pad 3a, or the entire periphery of the outer face of the bezel 40 may be abutted.

The engagement of the bezel 40 to the body fixing member 22 is performed by sandwiching the fixing section 24 of the body fixing member 22 between the portion of the pawl 41 protruded upward (the second portion) and the vertical walls 40a. After the pawl 41 is engaged to the fixing section 24, the opposite side of the pawl 41 of the bezel 40 is shifted downward (in the direction of the arrow D) to insert the frame abutting sections 45 through the opening 23b of the body fixing member 22, and a lower face 40b of the bezel 40 (the lower face of the portion positioned upward of the frame abutting sections 45) is abutted on the upper face 23a of the main body 23 of the body fixing member 22.

Here, the frame abutting sections 45, which are protruded downward (in the direction of the arrow D), are tilted downward and toward the center of the bezel 40 formed in frame shape, so that the frame abutting sections 45 can be easily inserted into the opening 23b. With this, the bezel 40 can be easily disposed to the body fixing member 22.

In a state where the bezel 40 is disposed to the body fixing member 22 (or where the lower face 40b of the bezel 40 is abutted on the body fixing member 22), the frame abutting sections 45 can be abutted on the inner peripheral edge of the opening 23b, and the vertical walls 40a can be abutted on both ends of the fixing section 24 formed to be protruded backward, so that the shift of the bezel 40 with respect to the body fixing member 22 in the left-right direction (the direction of the double-headed arrow L-R) can be restricted within the predetermined range. Likewise, the pawl 41 and the vertical walls 40a can be abutted on the fixing section 24, so that the shift of the bezel 40 with respect to the body fixing member 22 in the front-back direction (the direction of the double-headed arrow F-B) can be restricted within the predetermined range.

The frame abutting sections 45 are formed forward of the cover locking sections 43, and the vertical walls 40a are formed backward of the cover locking sections 43, so that at two positions spaced at a predetermined distance in the front-back direction, the bezel 40 can be abutted on the body fixing member 22. With this, the shift of the bezel 40 in which the up-down direction (the direction of the double-headed arrow U-D) is a rotation axis can be prevented. Also, the extension lengths of the cover locking sections 43 and the vertical walls 40a in the front-back direction (the direction of the double-headed arrow F-B) can be shortened, so that the product cost can be reduced, and the free degree of the design of the bezel 40 can be improved.

Also, in a state where the bezel 40 is disposed to the body fixing member 22, the portion of the pawl 41 protruded toward the center of the bezel 40 (the first portion) can be abutted on the lower edge (lower outer edge) of the fixing section 24, so that the shift of the bezel 40 to the up side (in the direction of the arrow U) with respect to the body fixing member 22 can be restricted within the predetermined range. Likewise, the lower face 40b of the bezel 40 can be abutted on the upper face 23a of the body fixing member 22, so that the shift of the bezel 40 to the down side (in the direction of the arrow D) with respect to the body fixing member 22 can be restricted within the predetermined range.

Then, the terminals of the trim cover 3c are locked to the cover locking sections 43 of the bezel 40. With this, the back pad 3a and the bezel 40 are covered by the trim cover 3c. It should be noted that in the trim cover 3c, an opening smaller than the opening of the back pad 3a is formed at the position corresponding to the opening of the back pad 3a, and to the opening ends (terminals) of the trim cover 3c, plate-shaped locking pieces (not illustrated) made of resin materials are coupled (sutured) at the positions corresponding to the cover locking sections 43, so that the locking pieces are locked to the cover locking sections 43.

As described above, since the portion of each of the cover locking sections 43 protruded downward (the second portion) is tilted downward and toward the center of the frame, each of the locking pieces can be easily engaged to the cover locking section 43 (or be easily inserted into between the inner face of the bezel 40 and the second portion, which are opposed to each other). Also, since the shift of the bezel 40 is restricted with respect to the body fixing member 22, the locking piece can be easily engaged to the cover locking section 43.

Also, as described above, since the shift of the bezel 40 to the up side (in the direction of the arrow U) with respect to the body fixing member 22 is restricted, even when in the mounting process, for example, the trim cover 3c is pulled to adjust the stretched state of the trim cover 3c, the bezel 40 can be prevented from being separated from the body fixing member 22 (or from failing out of the opening of the back pad 3a).

After the bezel 40 is mounted, the body 30 in a state where the lever 50 is axially supported is mounted (fixed) to the body fixing member 22. That is, the body 30 is shifted downward (in the direction of the arrow D), the protrusion sections 32 and 33 are inserted through the inside of the bezel 40 formed in frame shape and the opening 23b of the body fixing member 22 formed in frame shape, the body 30 is then shifted forward (in the direction of the arrow F), the abutting section 31c is abutted on the fixing section 24 of the body fixing member 22, and the body 30 (abutting section 31c) is fastened and fixed to the body fixing member 22 (fixing section 24) with the bolts BT.

It should be noted that in a state where the body 30 is mounted to the body fixing member 22, the trim cover 3c is sandwiched between the lower face of the exposing section 31 of the body 30 and the upper face 42 of the bezel 40.

Here, as described above, since the cover locking sections 43 of the bezel 40 (the second portions protruded downward) are formed to be tilted toward the center of the bezel 40 formed in frame shape, when the body 30 is shifted downward (in the direction of the arrow D), the body 30 (the outer face of the recess section 31a) is abutted on the body abutting sections 44 of the cover locking sections 43, so that the bezel 40 can be shifted in the left-right direction (the direction of the double-headed arrow L-R) and to the front side (in the direction of the arrow F) (or the bezel 40 can be escaped in the direction that does not inhibit the downward shift of the body 30). With this, the bezel 40 can be prevented from inhibiting the mounting of the body 30, so that the body 30 can be easily assembled to the body fixing member 22.

On the other hand, since the shift of the bezel 40 with respect to the body fixing member 22 in the left-right direction (the direction of the double-headed arrow L-R) and in the front-back direction (the direction of the double-headed arrow F-B) is restricted within the predetermined range, the bezel 40 can be prevented from being separated from the body fixing member 22 during the mounting of the body 30. With this, the body 30 can be easily assembled to the body fixing member 22.

The body 30 is fastened and fixed to the fixing section 24 of the body fixing member 22, and the bezel 40 is engaged to the fixing section 24 of the body fixing member 22. That is, the fixing position of the body 30 with respect to the body fixing member 22 and the engaging position of the bezel 40 with respect to the body fixing member 22 can be the same. With this, when an external force is applied to the body 30 or the bezel 40, the relative shift amount of the body 30 with respect to the bezel 40 can be made small. As a result, the load can be prevented from concentrating on a portion of the body 30 or the bezel 40, so that the body 30 or the bezel 40 can be prevented from being damaged.

Also, in a state where the body 30 is assembled to the body fixing member 22, the main body 23 of the body fixing member 22 is disposed (engaged) to the notch section 32a of the protrusion section 32 and the notch section 33a1 of the protrusion section 33, and the outer peripheral edge of the main body 23 is abutted on the upper faces of the protrusions 33a2, so that the number of abutting portions of the body 30 with respect to the body fixing member 22 can be increased, thereby preventing the body 30 from being deformed or damaged. In this case, the notch sections 32a and 33a1 and the protrusions 33a2 are formed on the front side (the side in the direction of the arrow F) of the body 30, and the abutting section 31c is formed on the back side (the side in the direction of the arrow B) of the body 30, so that the body 30 can be effectively prevented from being deformed or damaged.

Here, since the bezel 40 is a synthetic resin member, there is a fear that the bezel 40 is deformed (distorted) and cannot be disposed to the body fixing member 22, or that the body 30 cannot be mounted (fixed) to the body fixing member 22. On the contrary, in this embodiment, since the bezel 40 is formed in frame shape, and includes the frame abutting sections 45 and the body abutting sections 44, the frame abutting sections 45 and the body abutting sections 44 can be abutted to the opening 23b of the body fixing member 22 and the recess section 31a of the body 30 in the disposing (engaging, mounting) process of the bezel 40 and the body 30 to the body fixing member 22. With this, the bezel 40 can be deformed (distortion corrected), and the bezel 40 can be engaged to the body fixing member 22, so that the body 30 can be easily assembled to the body fixing member 22.

In the lock releasing unit 10 assembled as described above, the exposing section 31 of the body 30 and the upper face 42 of the bezel 40 are abutted via the trim cover 3c, and a gap is not formed between the exposing section 31 and the upper face 42 of the bezel 40, so that the portions of the body 30 other than the upper face of the exposing section 31 (the bottom wall 31b side of the recess section 31a, the protrusion sections 32 and 33, and the axial holes 34), the rotation plates 52 and 53 of the lever 50, and the like can be prevented from being visible. As a result, the appearance of the seat 1 can be prevented from being deteriorated.

In this case, the lower face 40b of the bezel 40 is abutted on the upper face 23a of the main body 23 of the body fixing member 22, and the upper face 42 of the bezel 40 is abutted on the exposing section 31 via the trim cover 3c, so that also in the case where the trim cover 3c is pushed in by the passenger to compress the back pad 3a, the shift of the bezel 40 can be prevented in the up-down direction (the direction of the double-headed arrow U-D) and in the front-back direction (the direction of the double-headed arrow F-B). With this, a gap can be prevented from being formed between the exposing section 31 and the upper face 42 of the bezel 40, so that the appearance of the seat 1 can be prevented from being deteriorated, that is, the appearance can be maintained.

Here, the rotation operation of the lever 50 to the up side (the releasing operation of the lock releasing section 6) is restricted in such a manner that the pair of sections on the side in which rotation is stopped 54 of the lever 50 are respectively abutted on the rotation restriction sections 37 of the body 30. The cover locking sections 43 (body abutting sections 44) of the bezel 40 are disposed at the positions overlapped with the rotation restriction sections 37, as seen in side view (or as seen in the direction of the double-headed arrow L-R). With this, for example, also in the case where the lever 50 is operated by an excessive force to cause a large force to act on the rotation restriction sections 37, thereby deforming the body 30, the outer face of the recess section 31a positioned near the rotation restriction sections 37 is abutted on the body abutting sections 44, so that the body 30 or the lever 50 (rotation plates 52 and 53) can be prevented from being deformed. As a result, the body 30 or the lever 50 can be prevented from being damaged.

The present invention has been described above based on the above embodiment, but the present invention is not limited to the above embodiment at all, and it can be easily inferred that various modifications can be made within the scope not departing from the purport of the present invention. For example, the shapes and materials given in the above embodiment are examples, and of course, other shapes and materials can be adopted. For example, the body 30 and the bezel 40 may be made of metals, and the bracket 20 may be made of a synthetic resin.

In the above embodiment, the case where the lock releasing unit 10 is disposed to the up side and the left side of the back frame 3b positioned at the shoulder of the seat 1 has been described, but the present invention is not necessarily limited to this, and the lock releasing unit 10 may be disposed to the back frame 3b positioned on the back face and the side face of the seat 1. Also, the lock releasing unit 10 may be disposed to the cushion frame 2a, that is, the lock releasing unit 10 may be disposed to the seat cushion 2.

In the above embodiment, the case where the lock releasing target by the lock releasing unit 10 is the reclining device 5 has been described, but the present invention is not necessarily limited to this. For example, a slide mechanism adjusting the slide position of the seat 1 with respect to the vehicle may be targeted.

In the above embodiment, the case where the inner shape of the opening of the back pad 3a is formed to be slightly smaller than the outer shape of the bezel 40 has been described, but the present invention is not necessarily limited to this, and the inner shape of the opening of the back pad 3a may be formed to have the same size as the outer shape of the bezel 40. Alternatively, the inner shape of the opening of the back pad 3a may be formed to be larger than the outer shape of the bezel 40. With this, the abutting of the opening of the back pad 3a and the vertical walls 40a of the bezel 40 can be prevented, so that the bezel 40 can be easily engaged to the body fixing member 22.

In the above embodiment, the case where each of the body abutting sections 44 is formed to be tilted toward the center of the bezel 40 formed in frame shape has been described, but the present invention is not necessarily limited to this, and the outer face of the recess section 31a of the body 30 (at least the outer face of the portion on which the body abutting section 44 is abutted) may be formed to be tilted toward the center of the recess section 31a.

The invention claimed is:

1. A vehicle seat comprising:
   a trim cover;
   a seat pad having a surface covered by the trim cover;
   a frame supporting the seat pad;
   a supporting device shiftably supporting the frame; and
   an operation device transmitting a releasing force to the supporting device to enable the frame to be shifted, the operation device being mounted to the frame through an opening of the trim cover,
   wherein the operation device includes:
      a body rotatably supporting a lever, the operation of the lever transmitting the releasing force to the supporting device, the body including an exposing section and an abutting section, wherein the exposing section extends around an outer periphery of the body and surrounds the lever, and the exposing section covers an outer surface of an edge of the trim cover at the opening of the trim cover;
      a body fixing member including an upper face, an opening, and a fixing section contacting the frame, wherein the upper face of the body fixing member extends around an outer periphery of the body fixing member, the abutting section of the body abuts against the fixing section of the body fixing member, and the abutting section of the body is secured to the frame through the fixing section of the body fixing member; and
      a bezel including an upper face, a frame abutting section, and a pawl, wherein the upper face of the bezel extends around an outer periphery of the bezel that presses an inner surface of the edge of the trim cover at the opening of the trim cover against the exposing section of the body, the upper face of the body fixing member abuts against the bezel, the frame abutting section of the bezel abuts a portion of an inner periphery of the opening of the body fixing member, and the pawl latches under the abutting section of the body.

2. The vehicle seat according to claim 1,
   wherein the bezel is more deformable than the frame.
3. The vehicle seat according to claim 1,
   wherein the bezel is more deformable than the body.
4. The vehicle seat according to claim 1,
   wherein the body includes a lever abutting section on which the lever is abutted.
5. The vehicle seat according to claim 1,
   wherein the seat pad includes a recess section in which the bezel is disposed.
6. The vehicle seat according to claim 1, wherein the upper face of the bezel is disposed between the exposing section of the body and the upper face of the body fixing member.
7. The vehicle seat according to claim 1,
   wherein the fixing section of the body fixing member extends below the upper face of the body fixing member,
   wherein the bezel further includes an opening coextensive with the opening of the body fixing member, and
   wherein the body further includes a plurality of protrusion sections extending below the exposing section and through both of the opening of the bezel and the opening of the body fixing member.
8. The vehicle seat according to claim 7,
   wherein each of the plurality of protrusion sections of the body includes a notch,
   wherein a portion of the inner periphery of the opening of the body fixing member is fitted in the notch of each of the plurality of protrusion sections of the body, and
   wherein the pawl of the bezel cups under an outer peripheral bottom edge of the fixing section of the body fixing member.
9. The vehicle seat according to claim 8,
   wherein the plurality of protrusion sections includes a first protrusion section and a second protrusion section, the first protrusion section including a downwardly extending wall, and the second protrusion section having a downwardly extending box shape with an opening opposite from the first protrusion section,
   wherein the second protrusion section further includes an outwardly extending protrusion disposed below the notch, and
   wherein an upper face of the outwardly extending protrusion of the second protrusion section of the body abuts an outer peripheral edge of the body fixing member.
10. The vehicle seat according to claim 9,
    wherein the exposing section of the body extends from a top of the vehicle seat to a back of the vehicle seat,
    wherein abutting section of the body extends along the back of the vehicle seat,
    wherein the pawl of the bezel extends along the back of the vehicle seat, and
    wherein the fixing section of the body fixing member extends along the back of the vehicle seat.
11. The vehicle seat according to claim 7, wherein the plurality of protrusion sections includes a first protrusion section and a second protrusion section, the first protrusion section including a downwardly extending wall, and the second protrusion section having a downwardly extending box shape with an opening opposite from the first protrusion section.
12. The vehicle seat according to claim 1,
    wherein the exposing section of the body extends from a top of the vehicle seat to a back of the vehicle seat, wherein abutting section of the body extends along the back of the vehicle seat, and wherein the pawl of the bezel extends along the back of the vehicle seat.

* * * * *